United States Patent Office 3,165,403
Patented Jan. 12, 1965

3,165,403
SUPERCONDUCTIVE MATERIALS

Harry N. Treaftis, Lee, Charles E. Watts, Jr., Pittsfield, and Raymond A. Meyer, Richmond, Mass., assignors to General Electric Company, a corporation of New York No Drawing. Filed Mar. 27, 1962, Ser. No. 182,925
6 Claims. (Cl. 75—169)

This invention relates to superconductive devices. More particularly, it relates to superconductive materials which are useful in joining together elements of a superconductive device or of serving as superconductive elements in and of themselves.

The use of electrically superconductive materials is well known. For example, it is well known to use such materials as the elements of superconductive circuits, such as those used in cryotrons, computer applications, infrared (IR) sensors, cryogenic gyros, as magnetic shielding films, in printed circuits, for magnetic switching, and the like. Since an advantage of super conductive devices is that they may be made very small, the physical elements of such devices often consist largely of very thin films or very fine delicate wires. Because of the delicate nature of these elements, they are very fragile and are prone to become disrupted with the application of heat. Thus, there is a problem of connecting together the various discrete elements of a superconductive device without, during the process, destroying the device itself or damaging it. When it is attempted to hot solder the parts of such a device, the heat required in and of itself destroys or damages the very fine and delicate elements or takes such care that the procedure is uneconomic.

From the above, it will be quie obvious that there is a definite need for ready superconductive means of joining fine superconductive elements without destroying them.

An object, therefor, of this invention is to provide convenient non-destructive means for soldering or joining together superconductive elements and to provide new superconductive elements or materials.

Briefly, the invention relates to amalgams of mercury and indium-tin alloys which can be used at room temperature without the application of external heat to join fragile superconductive elements and which may also serve as transmission lines or superconductive elements in and of themselves if desired. The materials contain by weight up to about 30 percent of a 50 percent indium–50 percent tin alloy with the remainder mercury and preferably such a combination in which mercury constitutes 86 percent of the material along with 14 percent of the indium-tin alloy. The specific preferred material has a critical temperature of 4.86° K.

Those features of the invention which are novel are set forth in the claims appended hereto. The invention will, however, be better understood and further advantages and objects thereof appreciated from a consideration of the following description.

The present alloys or amalgams are very readily made by simply combining the ingredients and amalgamating or mixing in any convenient way, the indium-tin alloy being typically in wire form cut into small pieces for combining with the mercury. In operation, the present materials when used to join superconductive elements, such as lead, niobium, indium, and the like, are merely applied at room temperature to the adjacent portions of the elements to be joined. The amalgam serves to hold the elements together through all but the most violent physical abuse which would in and of itself destroy the elements themselves. The amalgam is particularly characterized by the fact that it takes a long time to set to a rigid state at room temperature, such time being of the order of months, so that the elements are readily unjoined and rejoined as desired at room temperature. On the other hand, at low temperatures, the solder forms a rigid joint which is superconductive just as the joined superconductive elements themselves.

The following examples will illustrate the preparation of the materials of the invention, it being realized that variations may be incorporated without departing from the spirt and scope of the invention. All parts are by weight.

*Example 1*

There were mixed together at room temperature 95 parts of mercury and 5 parts of 50 percent indium–50 percent tin alloy wire cut in small pieces, the mercury dissolving the indium-tin alloy quite readily with simple stirring. The critical temperature of this material was found to be 4.2° K.

*Example 2*

Example 1 was repeated except that 90 parts of mercury and 10 parts of the indium-tin alloy were used. The critical temperature of this material was found to be 4.73° K.

*Example 3*

Example 1 was repeated except that 86 parts of mercury and 14 parts of indium-tin alloy were used to prepare an amalgam having a critical temperature of 4.86° K. The relatively high critical temperature of this material makes it particularly suitable for many cryogenic purposes.

*Example 4*

Example 1 was repeated using 78 parts of mercury and 22 parts of indium-tin alloy wire to prepare a superconductive material having a critical temperature of 4.76° K.

*Example 5*

Example 1 was repeated using 70 parts of mercury and 30 parts of indium-tin alloy to produce a material having a critical temperature of 4.70° K.

It will be realized that smaller amounts of indium-tin alloy, approaching compositions consisting of 100 percent mercury can also be used to provide superconductive materials.

It has been found that when over about 30 percent by weight of the material consists of the indium-tin alloy, some heating is necessary to dissolve the alloy in the mercury. Since this material solidifies again at room temperature, it is not useful as a cold solder.

In addition to being used as a solder, the present amalgams can be used as superconductive materials or elements themselves and serve very well, for example, as superconductive transmission lines. The amalgam can be brushed, skived or otherwise spread on a very thin base material, such as of paper, cloth, resin, and the like, circuits or areas of any configuration being readily made from the easily-worked material.

From the above, it will be seen that there are provided by this invention superconductive material which are useful in joining together superconductive elements and also of serving as superconductive elements themselves. In this respect, they are useful in many superconductive devices and circuits, including, and not limited to, cryotrons, computers, cryogenic gyroscopes as magnetic shielding films, in printed circuits, in IR sensors, in magnetic switching devices, and the like. They are particularly useful in disassembling or replacing defective or worn out elements of apparatus.

What we claim as new and desire to secure by Letters Patent of the United States is:

1. A superconductive material consisting essentially of by weight from about 70 to 95 percent mercury and from about 5 to 30 percent of an alloy consisting essentially of 50 percent indium and 50 percent tin.

2. A superconductive material consisting essentially of by weight 95 percent mercury and 5 percent of an alloy consisting of about 50 percent indium and 50 percent tin.

3. A superconductive material consisting essentially of by weight 70 percent mercury and 30 parts of an alloy consisting of about 50 percent indium and 50 percent tin.

4. A superconductive material consisting essentially of by weight 78 percent mercury and 22 parts of an alloy consisting of about 50 percent indium and 50 percent tin.

5. A superconductive material consisting essentially of by weight 86 percent mercury and 14 parts of an alloy consisting of about 50 percent indium and 50 percent tin.

6. A superconductive material consisting essentially of by weight 10 parts of an alloy consisting essentially of 50 percent indium and 50 percent tin with the remainder mercury.

References Cited by the Examiner

UNITED STATES PATENTS 1,959,668 5/34 Gray ---------------- 75—169

FOREIGN PATENTS 1,250,833 12/60 France.

DAVID L. RECK, *Primary Examiner.*